United States Patent [19]

Mandros

[11] 4,347,791
[45] Sep. 7, 1982

[54] VEHICLE GUIDEWAY SYSTEM

[76] Inventor: James A. Mandros, 60 Newcastle Rd., Peabody, Mass. 01960

[21] Appl. No.: 5,196

[22] Filed: Jan. 22, 1979

Related U.S. Application Data

[63] Continuation-in-part of Ser. No. 785,455, Apr. 7, 1977, abandoned.

[51] Int. Cl.³ .................... B61B 13/08; B61B 13/10; B60V 3/04
[52] U.S. Cl. .................................. 104/156; 92/88; 104/23 FS; 104/138 R; 104/139; 104/140; 104/161
[58] Field of Search ............... 104/23 FS, 134, 138 R, 104/139, 140, 141, 155, 156, 161; 105/63; 92/88; 180/117, 119, 120, 164

[56] References Cited

U.S. PATENT DOCUMENTS

| | | | |
|---|---|---|---|
| 3,352,512 | 11/1967 | James, Sr. .................... | 104/155 X |
| 3,428,272 | 2/1969 | Feder ............................ | 92/88 X |
| 3,566,800 | 3/1971 | Chuan et al. .................. | 104/138 R |
| 3,722,424 | 3/1973 | Van Veldhuizen ............ | 104/23 FS |
| 3,768,418 | 10/1973 | Yoshida ......................... | 104/161 |
| 3,788,231 | 1/1974 | Bloomfield .................... | 104/23 FS |
| 3,859,925 | 1/1975 | Hartz .............................. | 104/140 |
| 3,889,602 | 6/1975 | Barber ............................ | 104/155 X |
| 3,910,196 | 10/1975 | Denenburg .................... | 104/23 FS X |
| 4,023,500 | 5/1977 | Diggs ............................. | 104/155 X |
| 4,027,596 | 6/1977 | Nardozzi, Jr. ................. | 104/138 R |

Primary Examiner—Randolph A. Reese
Attorney, Agent, or Firm—Thomas C. Stover, Jr.

[57] ABSTRACT

A guideway system for cargo including vehicles is provided wherein a carriage glides on a rail mounted in a channel. The rail has compressed air discharge ports and vacuum intake ports positioned longitudinally therealong. The compressed air ports emit sufficient air to provide an air support cushion under the carriage and to impart positive air pressure behind it while the vacuum ports reduce the air pressure forward of the carriage to create an air pressure differential that propels the carriage along such rail. Vehicles drive onto a carriage, are secured in place and are conveyed to a desired station on such carriage. The vehicle then unloads from the carriage and drives off to its final destination. Similarly, other cargo is loaded onto a carriage and unloaded at its destination.

In another embodiment, the carriage has a longitudinal slot in its underbody adjacent its support rail and compressed air is discharged from ports in the rail at the forward portion of the slot to propel the carriage along the rail.

23 Claims, 20 Drawing Figures

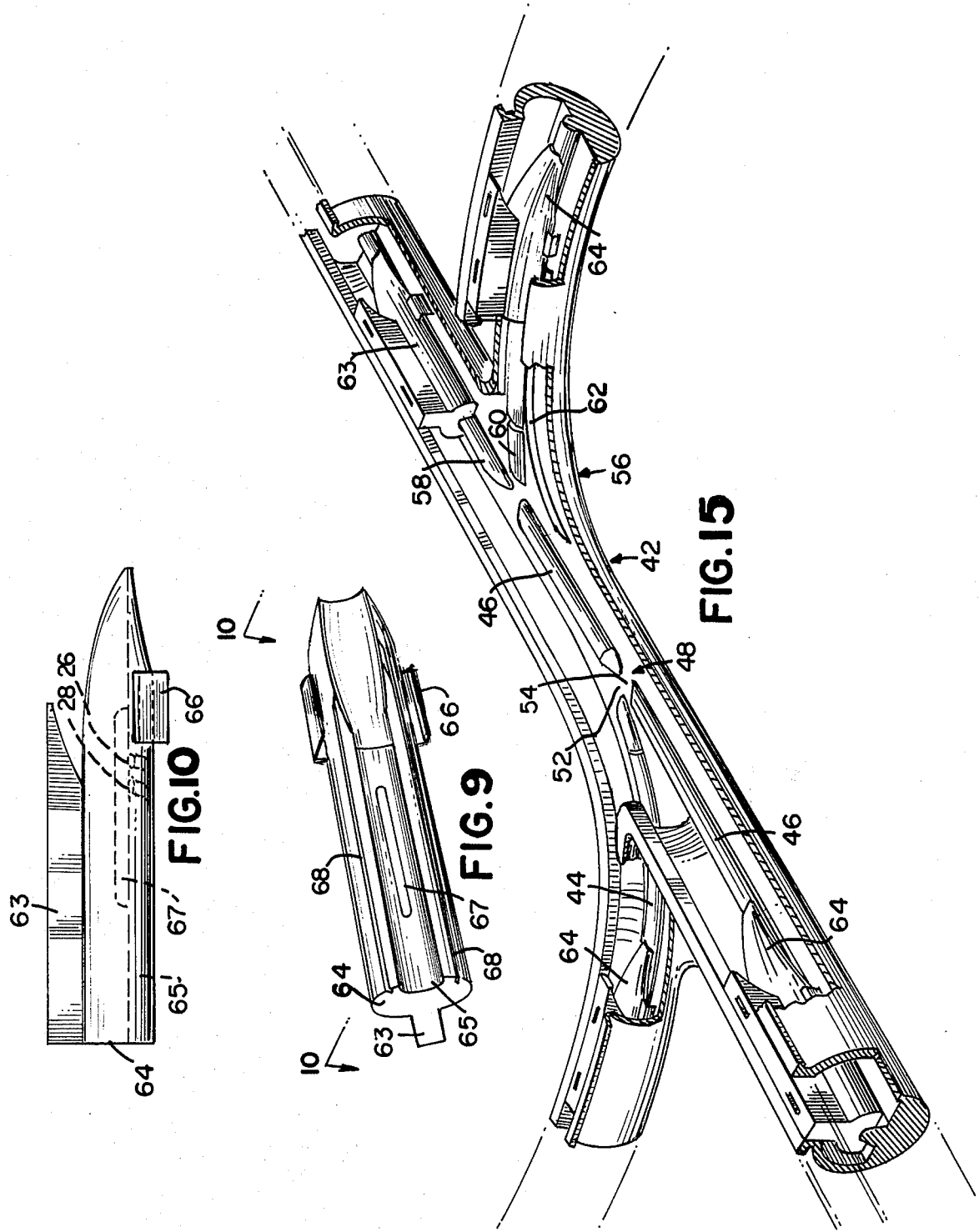

VEHICLE GUIDEWAY SYSTEM

This application is a Continuation-In-Part of my prior co-pending application, Ser. No. 785,455, filed Apr. 7, 1977, now abandoned, having the same title.

FIELD OF THE INVENTION

This invention relates to a cargo transportation system, particularly a guide-way system in which cargo, including vehicles, are transported on carriages in a guideway system.

THE PRIOR ART

Public transportation of passengers and goods, as exemplified by buses and trains, has in the past, been widely used in many countries. This system, however, has met with increasing competition from non-mass transportation means, eg. motor vehicles, including autos and trucks, particularly in the United States, on a growing network of roads and highways.

Both systems have advantages and drawbacks. The mass transportation system transports people and goods over more compact corridors, uses relatively less fuel and is more efficient. However, the mass transportation system is often inconvenient and one must acquire a schedule, travel to a certain point of departure and wait for a conveyance. At the other end of the line, one must find another conveyance to the final destination which adds delays in transit.

The motor vehicle system provides the advantage of convenience in that one is not bound by schedules or the need to get to a station and await transportation. Instead one merely gets into his vehicle and drives off when ready and proceeds directly to his destination. However, the convenience of motor vehicles meets with significant drawbacks. The miles of roads and highways required are widespread and numerous. Then there is encountered delays in transit including traffic jams, especially in population centers. Moreover, each vehicle requires a driver, many vehicles are occupied by but one person or two, i.e. this system requires a high percentage of drivers in proportion to the people transported. In addition, each truck requires one or two drivers, all of which results in a highly inefficient use of manpower compared with mass transportation systems as well as a waste of vehicle power and space. In sum, there is a great inefficiency in the motor vehicle which tends to counter-balance the convenience to a large degree. Moreover, with the recent wide-spread energy shortages in this country and abroad, and the increased cost of fuel, it is imperative that a transportation system be found which, if possible combines the fuel economy and efficiency of the mass transportation system with the convenience of individual motor vehicle transport. There is therefore a need and market for transport system which substantially meets the shortcomings of the above prior art transportation systems.

There has now been developed a guideway system for cargo which inserts conventional roadway cargo including vehicles into a guideway system, which system then automatically transports such cargo along the corridors thereof to a selected destination and then where the cargo is a vehicle, permits the vehicle to then re-enter the roadway system under its own power. The guideway system thus frees the vehicle's operator from driving duties, permitting him the concentrate on business duties or other matter in transit. Passengers and cargo are transported in this way, the driver being freed for other duties or being excused from making the trip, with another driver meeting the cargo, including a vehicle, at its destination to drive it over the existing road system to the final stop. The cargo's propellant power can be employed in the guideway system but preferably is turned off and fuel conserved while the cargo is propelled by other propellant means in the guideway system.

SUMMARY OF THE INVENTION

Broadly, the present invention provides a guideway system for cargo including vehicles, which comprises a carriage mounted to glide in a channel, the carriage having support means to hold the cargo thereon and fluid pressure differential means to apply relative gas pressure behind a surface of the carriage to propel it in the channel.

In another embodiment of the invention gas pressure means imparts positive gas pressure under and behind the carriage.

In another embodiment of the invention gas pressure means imparts positive gas pressure under and behind the carriage and gas evacuating means reduces the gas pressure in the channel forward of the carriage to propel the carriage forward in the channel.

In another embodiment the carriage has at least one recess therein, and gas outlet means directs gas at the forward portion of the recess to propel the carriage forward in the channel.

In another embodiment carriage and cargo travel on an enclosed guideway tunnel drawn by fluid pressure differential means.

In another embodiment, the carriage travels in a guideway channel while the cargo rides above the channel in the atmosphere, the carriage being driven in such channel by fluid pressure differential means.

In several embodiments of the invention disclosed herein, unlike prior art disclosures, fluid pressure differential is applied against a carriage body surface (as opposed to an extended vane). Such pressure need not be applied to both carriage and cargo or a container for carriage and cargo, but can be applied to the carriage body itself, or a portion thereof, including an interior surface, which includes a recess surface thereof. The recess (or slot), as previously indicated, can be in the carriage underside or other side, adjacent pressure ports or vacuum and pressure ports.

BRIEF DESCRIPTION OF THE DRAWINGS

The invention will become more apparent from the following detailed specification and drawings in which:

FIG. 9 is an isometric projection of another carriage component of the guideway system embodying the invention;

FIG. 10 is an elevation view of the carriage component of FIG. 9, taken on line 10—10, looking in the direction of the arrows;

FIG. 15 is an isometric projection, partially in section, of intersecting tracks of the guideway system embodying the present invention;

DETAILED DESCRIPTION OF THE DRAWINGS

Figure 1:
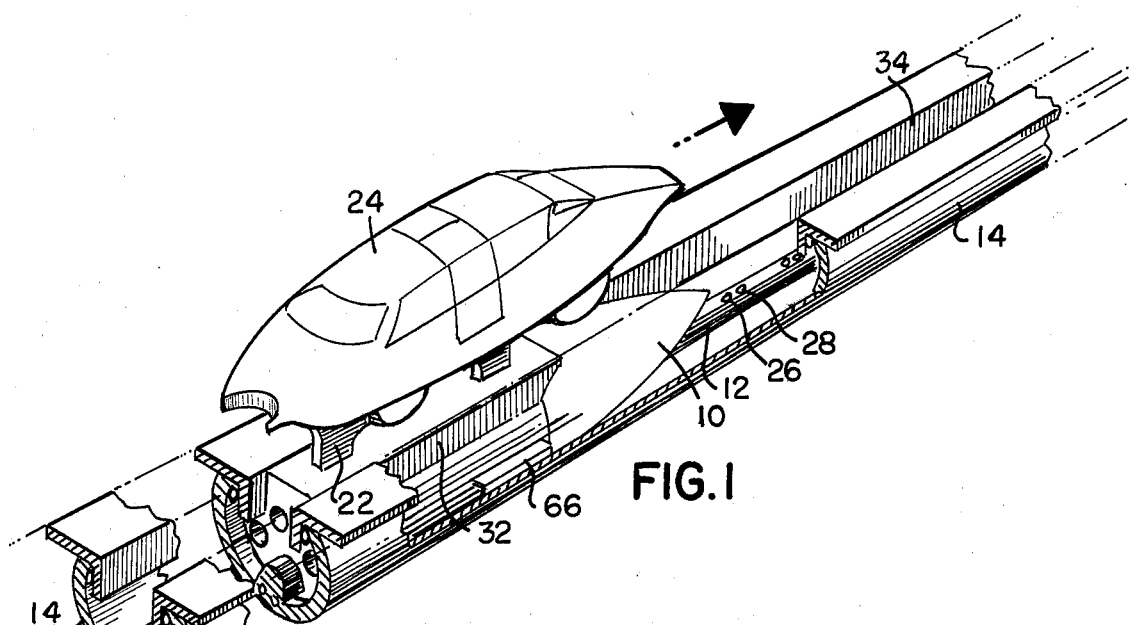
FIG. 1 is an isometric view, partially in sections, of the guideway system embodying the present invention.
Figure 4:
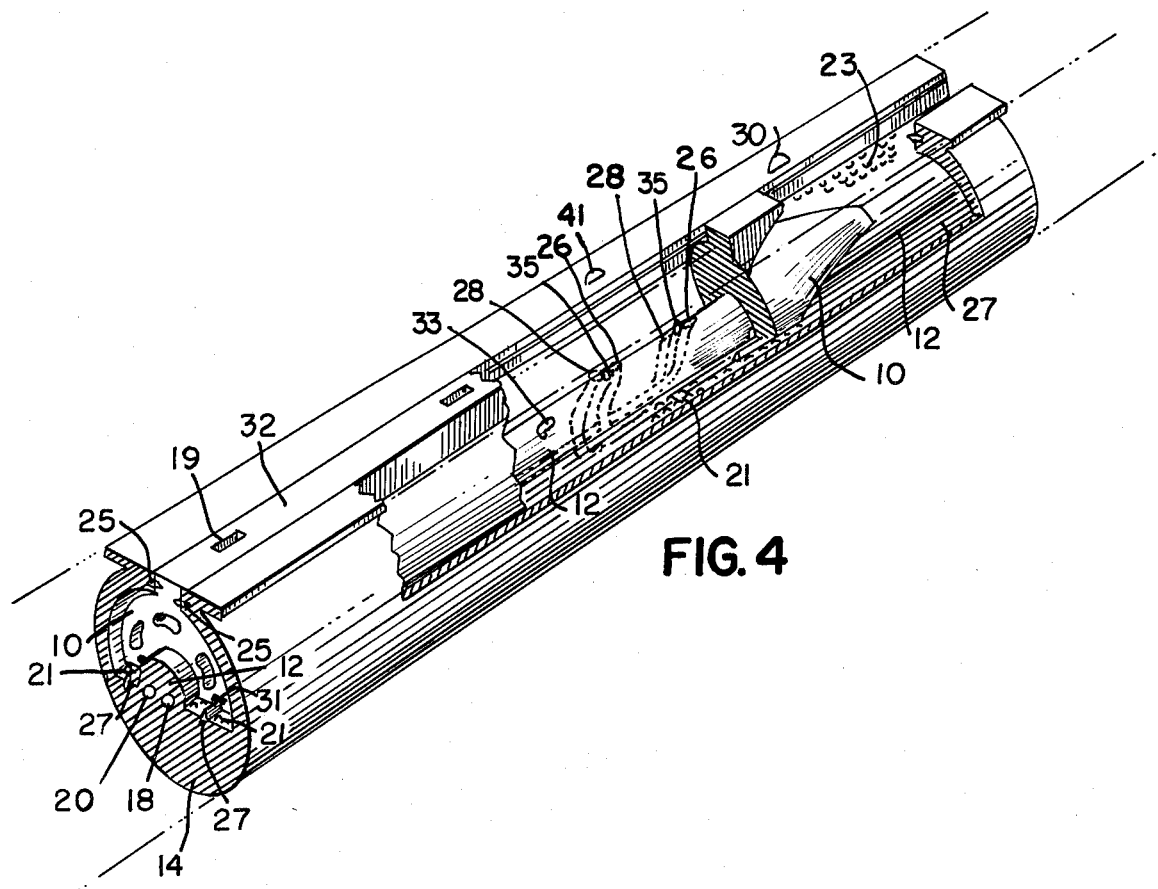
FIG. 4 is an enlarged isometric sectional projection of a portion of the guideway system embodiment of the invention shown in FIG. 1.
Figure 5:
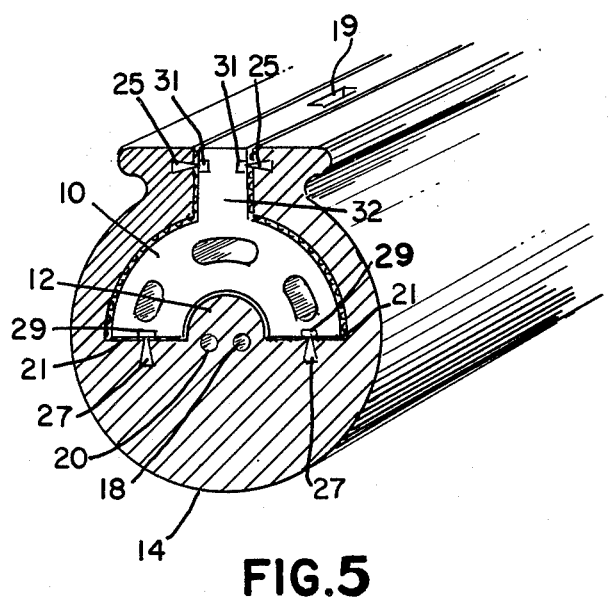
FIG. 5 is a further enlarged isometric projection detail of a portion of the guideway system embodiment of the invention shown in FIG. 4.

Referring now in detail to the drawings, missile carriage 10 rides on rail 12 in guideway channel 14, as shown in FIGS. 1, 2, 4 and 5. The channel 14 is supported by upright column 16 as shown in FIG. 1. The rail 12 is hollow, with compressed air trunk line 18 and vacuum trunk line 20 extending longitudinally therein, as shown in FIGS. 1 and 4. These ducts 18 and 20 can be connected via a blower and/or air compressor in a loop or loops or such ducts can be connected to independent systems. Mounted on the carriage 10 is support bracket 22, which supports as cargo, passenger vehicle 24 thereon, as shown in FIG. 1.

Figure 6:
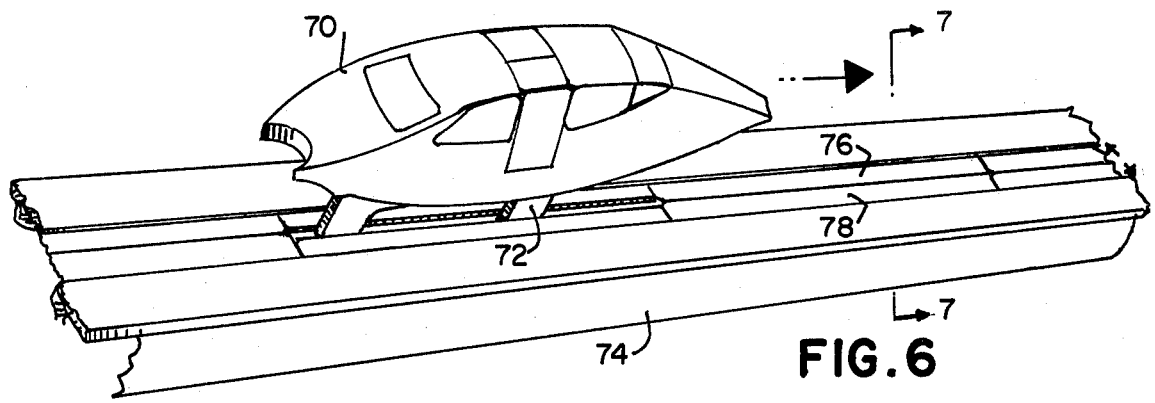
FIG. 6 is a partial isometric view of another embodiment of the guideway system of the present invention.
Figure 7:
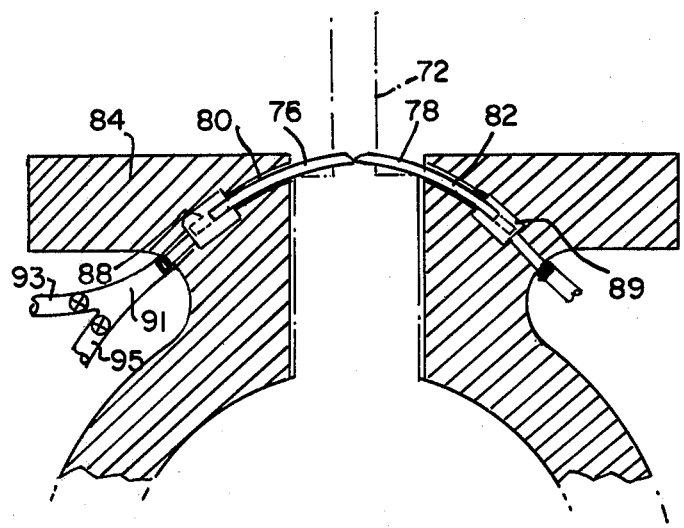
FIG. 7 is a sectional elevational view of a portion of the guideway system embodying the invention shown in FIG. 6, taken on line 7—7, looking in the direction of the arrows.

In another embodiment, vehicle 70 rides on support bracket 72 on missile carriage (not shown) within the guideway channel 74 which is sealed from the atmosphere by rectractable shutter gates 76 and 78 as shown in FIGS. 6 and 7. The gates 76 and 78, slideably mounted in slots 80 and 82 of the walls 84 and 86 of the guideway channel 14, are resiliently held in the closed position by a series of springs eg. air springs 88 and 89 also mounted in said channel walls 84 and 86, which closed gates maintain the air pressure in such guideway channel 74, independent of the atmospheric pressure outside, as shown in FIG. 7. The air springs, eg. spring 88 are connected by a forked valve 91 to air pressure line 93 and vacuum line 95. The valve in the vacuum or low pressure line 95 is closed and the air valve in the air pressure line 93 is opened to feed pressurized air into the air spring 88 to close the shutter gates 76 and 78, shown in FIGS. 6 and 7.

On the approach of a carriage a switch is tripped and reduced pressure applied to air springs 88 and 89 which retracts the shutter gates 76 and 78, slightly, just ahead of the approaching vehicle supports 72, which pass therebetween and trip a subsequent relay, which opens the next set of shutter gates (by reduced pressure) and closes the previous ones (by pressurized air) as indicated in FIGS. 6 and 7.

Accordingly, the carriage (not shown) which is similar to the carriage 10 shown in FIG. 1 or 4, rides on a guiderail, such as guiderail 12 shown in FIGS. 1 and 4, and is propelled by compressed air behind and a reduced pressure zone before, under cover of the channel shutter gates 76 and 78, shown in FIGS. 6 and 7.

Alternatively, the shutter gates can retract against springs, eg. metal behind springs, and be pushed apart by the supports 72 for the vehicle 70 as such supports knife between or slightly part the gates 76 and 78 in passing, the gates 76 and 78 then closing under pressure of their respective springs, to maintain the guideway channel seal as before, as indicated in FIGS. 6 and 7.

As an alternative to the shutter gates 76 and 78 illustrated in FIGS. 6 and 7, spacer members which fit in the channel slot in place of such gates 76 and 78 and which glide ahead of and behind such carriage eg. carriage 70 shown in FIG. 6, can be employed. Such spacers which would contact each other in series and may or may not be connected, would be of light weight durable material eg. wood, plastic, metal and ride in a slot such as slots 80 and 82 shown in FIG. 7 and would serve to maintain the pressure seal in the guideway channel in lieu of such shutter gates 76 and 78.

The compressed air is released from the rail 12 by the compressed air inlet 18 through a series of compressed air ports 26 which builds up positive pressure behind the carriage 10 and also a cushion of air thereunder as shown in FIG. 1. The vacuum line 20 is connected by a series of vacuum ports 28 to the upper surfaces of the rail 12, which ports suck excess air from the front of the carriage 10 to create a reduced pressure zone threat. The pressure differential serves to drive such carriage forward in the guideway tube, shown in FIGS. 1 and 4. The pressure differential is greater and more effective for carriage propulsion where such guideway tubes (eg. FIGS. 1 and 4) are closed by shutter gates such as those illustrated in FIGS. 6 and 7.

Alternatively, or additionally, in the embodiments of FIGS. 1 to 6, a recess or slot 67 is provided in the under portion of carriage 64, as shown in FIGS. 9 and 10. As shown in such figures, each compressed air port 26 exerts a forward thrust against the forward surface of such under carriage slot 67 while the adjacent vacuum port 28 evacuates the trailing portion of the slot 67 as more fully explained below, to propel the carriage 64 forward in any guideway channel described herein.

Figure 11:
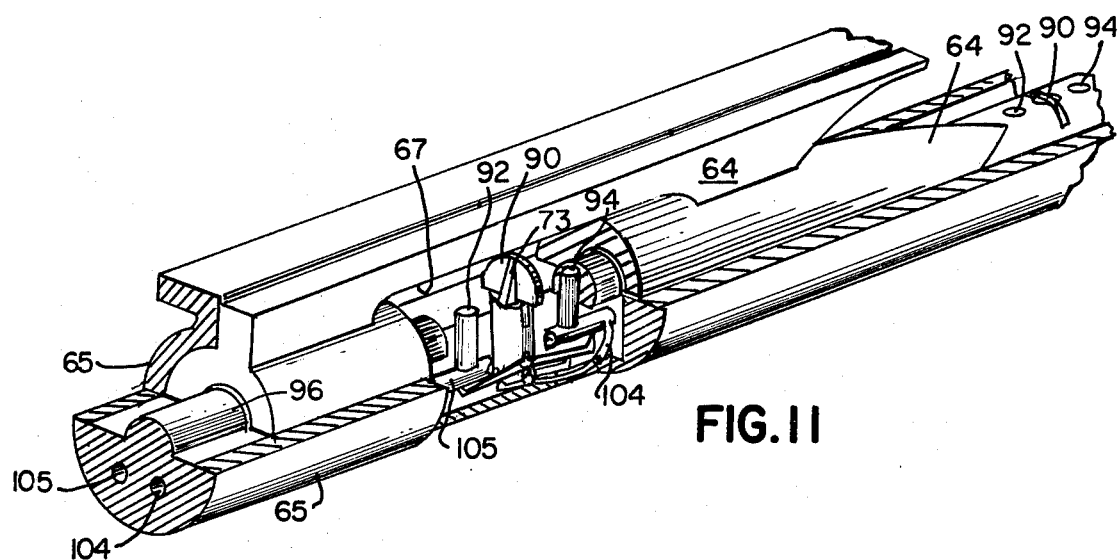
FIG. 11 is an isometric projection, partially in section, showing details of the carriage component of FIGS. 9 and 10 mounted on the guiderail of another guideway system embodying the present invention.

As shown in more detail, in FIGS. 11 to 14, a reciprocal seal gate 90, mounted between vacuum port 92 and compressed air port 94, which gate is sized and shaped to closely fit such channel 67 in cross section, serves to substantially seal the reduced pressure zone aft and the high pressure zone forward, from each other to assist the propulsion of the carriage 64, as discussed above and shown in FIGS. 11, 12, 13, and 14. The carriage 64, which can ride in a sealed-off (FIG. 6) or open (FIG. 1)

guideway channel, rides on guideway rail 96, as shown in FIG. 11.

Figure 12:
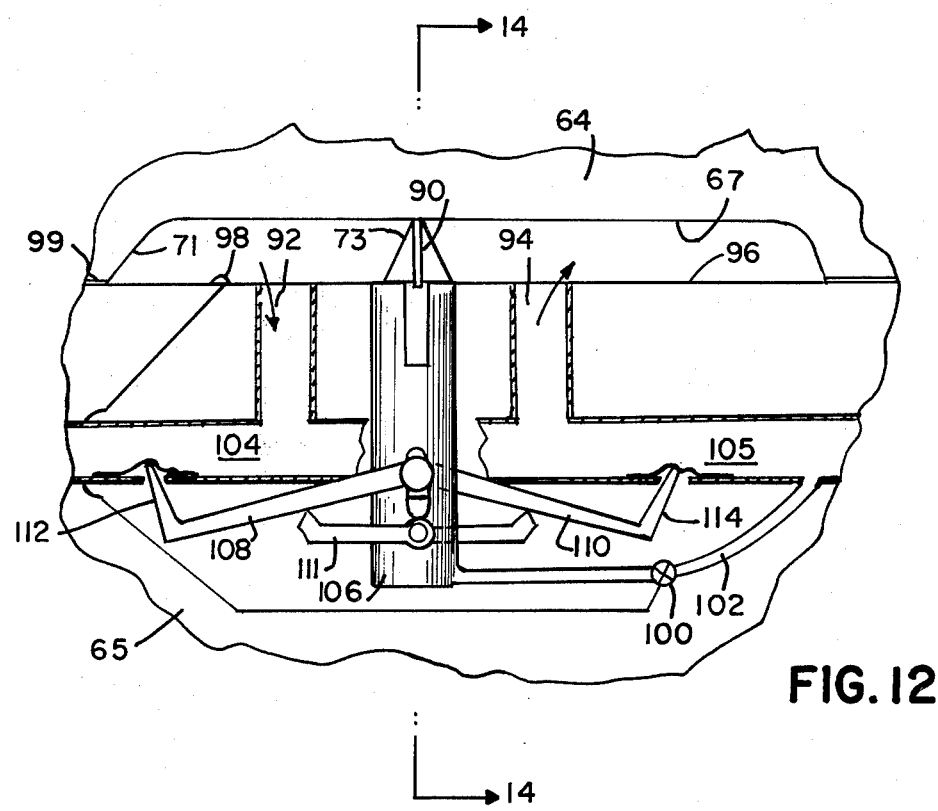
FIGS. 12 and 13 are enlarged sectional elevation details of a portion of the guideway system of the invention shown in FIG. 11.
Figure 13:
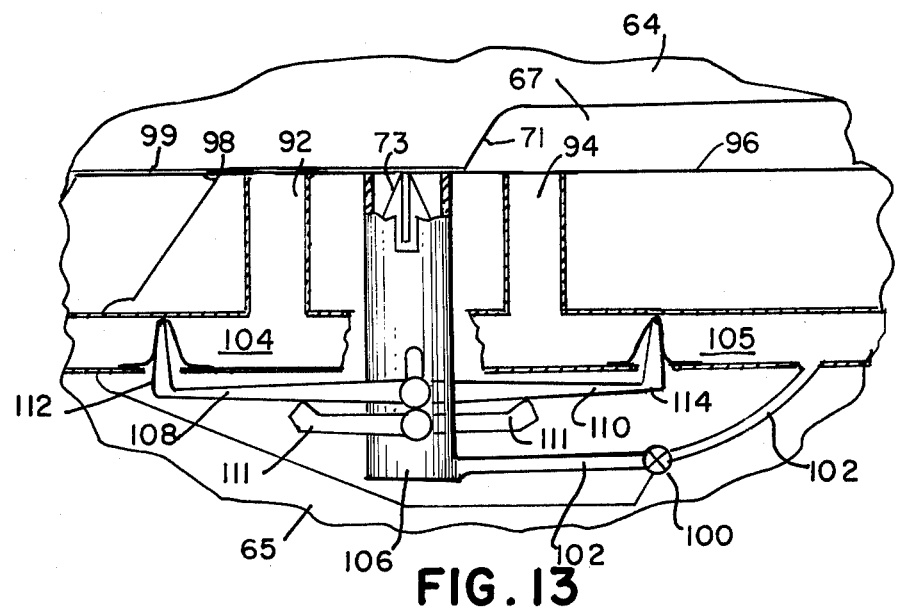
Figure 14:
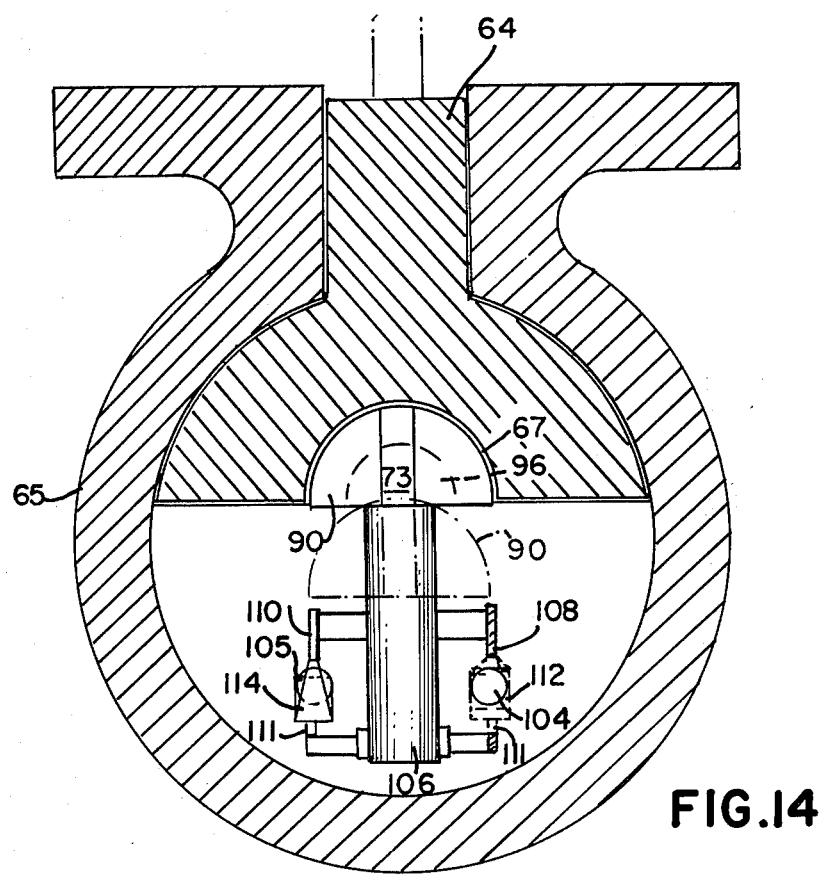
FIG. 14 is a sectional elevation view of a portion of the guideway system embodying the invention, shown in FIG. 12, taken on line 14—14 looking in the direction of the arrows.

In operation, the carriage 64 riding on the guiderail 96 with the seal gate 90 in the down position (FIG. 13), the leading portion of the carriage 64 passes over and trips a relay 98, FIG. 13, which opens the valve 100 in compressed air duct 102, which connects compressed air trunkline 105 with air spring 106, which expands same, pushing upwardly on the seal gate 90, which however is held in the down position on the guideway rail 96 by the base of the carriage 99 passing thereover, (whether the fore or aft base) as indicated in FIG. 13. When the recess or slot 67 of the carriage 64 passes over such gate 90, the gate rises under pressure of the air spring 106 to the top of such slot 67, as indicated in FIGS. 12 and 14 and in doing so, pivots the valve arms 108 and 110 around the support member 111, withdrawing respectively the valve seat 112 from the vacuum trunk line 104 and withdrawing the valve seat 114 from the compressed air inlet trunk line 105, to open such lines and activate respectively, the vacuum port 92 on one side of the gate 90 and the compressed air discharge port 94 on the other side of such gate 90, to propel the carriage 64 forward as previously described and/or indicated in FIGS. 11 to 14.

As the carriage slot 67 moves by the seal gate 90, the rear wall 71 of such slot contacts the sloping cam surface 73 of the seal gate 90, pressing the gate 90 downwardly into its air spring 106 to its retracted position, as the base 99 of the carriage 64 moves thereover, as shown in FIG. 13. When the gate valve 90 retracts, it pivots the valve arms 108 and 110 and the valve seats 112 and 114 upwardly into, respectively, the vacuum trunk line 104 and the compressed air trunkline 105, closing same. As the trailing base 99 of the carriage 64 moves over the relay 98, again an electric signal is sent to the valve 100 which closes the air duct 102 and holds the seal gate 90 in the down or retracted position after said carriage 64 glides by and until the next carriage glides along on the guideway rail 96 to contact the relay 98 and repeat the above air spring-gate valve activation sequence.

In this manner the vacuum port 92 and the compressed air port 94 are activated only as needed ie. when the carriage slot 67 passes thereover and such ports are shut off when not needed. The vacuum port and compressed air port, divided by such real gate, from a fluid propelling assembly, which assemblies are spaced apart on the guideway rail 96 a sufficient distance to keep the carriage and its cargo moving or gliding at a desired speed. The spacing will depend upon various factors including the weight of the carriage and its length, as well as the desired carriage speed, the amount of vacuum and compressed air applied and the like.

The so-propelled slotted carriage embodying the guideway system of the present invention can operate in a pressure controlled channel eg. sealed off with retractable shutter gates, such as shown in FIGS. 6 and 7 or can operate in a non-pressureized guideway channel such as shown in FIGS. 1 and 4, since such slotted carriage and port-gate assembly has its own internal pressure differential propulsion means as discussed above.

Though one type of valve lever seating means to close and open the trunk lines 104 and 105 respectively, is shown in FIGS. 12,13 and 14, other trunk line opening and closing means can be employed including dampers which are gear driven by the reciprocating seal gate 90 to open and close such trunk lines. Other trunk line control ie. opening and closing means can also be employed within the scope of the present invention.

Further, the vacuum trunk line and the pressurized air trunk line can be interconnected through one or more compressors in a cyclic system or can be separate and independent trunk line systems as desired.

In another embodiment, the seal gate 90 and its related assembly (air spring, valve arm and the like) are omitted with the vacuum port 92 and the gas pressure port 94 remaining as indicated in FIG. 11 or 10. The two ports are positioned in the same order as before and spread apart a desired distance, eg. as indicated in FIG. 11 or a greater distance. In operation when the leading portions of the carriage recess 67 passes over the vacuum port 92, it is activated pulling air out of the recess 67 and pulling the carriage forward over the pressure port 94. Then the vacuum port 92 is closed, the pressure port 94 is activated to direct air into the recess 67 and push the carriage 64 forward to propel same in the guideway channel 65.

In another embodiment similar to that above the seal gate 90 and related assembly are again omitted, with the vacuum port 92 and the gas pressure port 94 remaining as indicated in FIG. 11 (or FIG. 10). In operation, both ports are activated at least partly together as the carriage recess passes thereover eg. when the leading portion of the recess 67 first passes over the vacuum port 92 or when such leading portion passes over the pressure port 94 so that the pressure port directs air and a forward thrust at the forward portion of such carriage recess or slot 67 while the rearward vacuum port evacuates air from the trailing portion of the slot. In this manner, the vacuum port 92 does not significantly interfere with the pressure port 94 due to the rapid movement of the recess or slot 67 thereover, and the carriage is accordingly propelled in the channel. After the carriage has gone by, these ports are closed by means not shown.

This mode of interior pressure propulsion works whether the guideway channel is sealed by shutter gates, as shown in FIG. 6 or open to the atmosphere, as shown in FIG. 1.

Electrical contact is maintained with the carriage 10 by means of brushes 29 and 31 which contact respectively, electric rails 27 and 25 mounted in the guideway channel 14 as shown in FIG. 4. Such electric rails 27 and 25, shown also in FIG. 5, also serve as longitudinal seals as the carriage 10 passes thereover to maintain an air cushion around the periphery thereof to assist the carriage gliding in the channel during the propulsion thereof. In the absence of the supporting air cushion, the carriage 10 rides on lower bearings 21 and upper bearings 23 in the guideway channel 14 as shown in FIG. 4.

Figure 2:
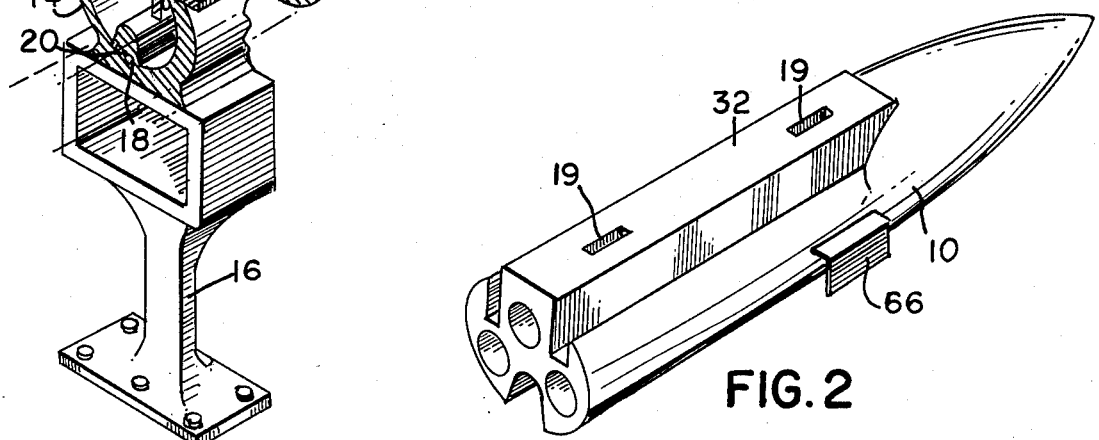
FIG. 2 is an isometric view of a carriage component of the guideway system of FIG. 1.

The upper portion of the carriage 10 is preferably shaped as a rectangular ridge 32 which fits in close clearance with the slot 34 of the channel 14, which ridge 32 has a plurality of support bracket receiving slots 19 therein so as to securely hold the support bracket 22 and thus the passenger vehicle 24 mounted thereon, as shown in FIGS. 1, 2 and 4.

Figure 8:
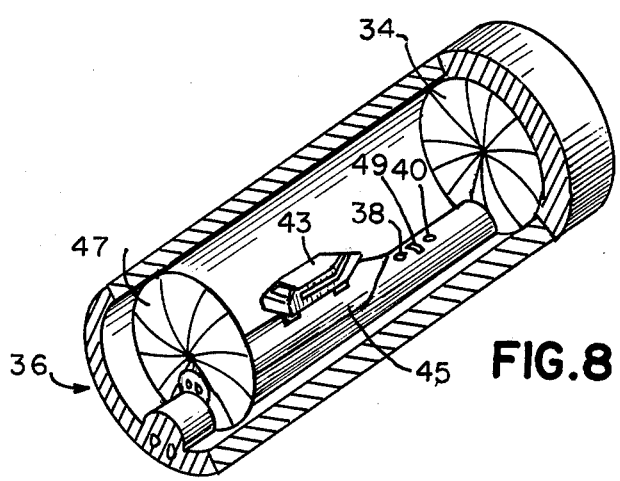
FIG. 8 is an isometric projection, partially in section, of another guideway system embodying the invention.

In another embodiment of the invention, the carriage embodying the invention and its cargo can both ride in a wholly enclosed tube, such as guideway tube 36, shown in FIG. 8. The cargo, eg. vehicle 43, rides on carriage 45 which, optionally, has a fan tail 47 mounted thereon which can open in the manner of a fan to extend across the tube (and can also close up when desired). Again air is fed under the carriage 45 by inlet port 40 and behind the carriage (and fan tail) to create relative air pressure therebehind to propel same in the tube 36, shown in FIG. 8.

The fan tail 47 acts as a sail or moveable baffle to enhance and maintain the pressure differential aft and forward thereof to assist propulsion of the carriage and cargo in the guideway tube 36, again shown in FIG. 8.

Advantageously, evacuating ports such as port 38 are employed, as above described, to create a reduced pressure zone before the carriage. Such ports 38 are turned on to evacuate air as the carriage 45 approaches and are shut off as such carriage passes thereover by either by switching means 49 or other switching means not shown. At the same time, or shortly thereafter, the adjacent air inlet port 40 is turned on to feed air under and behind the carriage 45 to propel it forward as above described.

The further enhance such propulsive pressure differential, a camera shutter flap valve 34, as shown in FIG. 8, can optionally be mounted at spaced intervals in said guideway tube 36 and tube segments between such shutter valves evacuated by one or more evacuating ports such as port 38.

Then, in operation, as the carriage 45 and cargo 43 (with or without a fan tail 47) approach, propelled by a push of positive air pressure, the base of the carriage 45 contacts and trips control switch 49, which opens the shutter valve 34 and opens the air inlet port 40 as above described, and carriage and cargo rush through a series of opening shutter valves and through low pressure zones at high speed and low air resistance.

Additionally, the air-evacuating port 38 can be opened as the carriage approaches it and the shutter valve 34, to draw off air until such port 38 is closed as the carriage passes thereover, as above described.

After the carriage and cargo have passed by, the shutter valves can be closed and the tube segments between closed valves evacuated by ports 38 by switching means 49 down the rail or switching means not shown.

In addition, the evacuating port 38, switch or gate member 49 and inlet port 40 shown in FIG. 8, can serve in the manner of evacuating port 92, gate seal 90 and compressed air port 94 to propel a sloted carriage such as carriage 64, shown in FIGS. 11 to 14, in the guideway tube 36, shown in FIG. 8, with or without employing either such fan tail 47 or the shutter valve 34.

Figure 3:
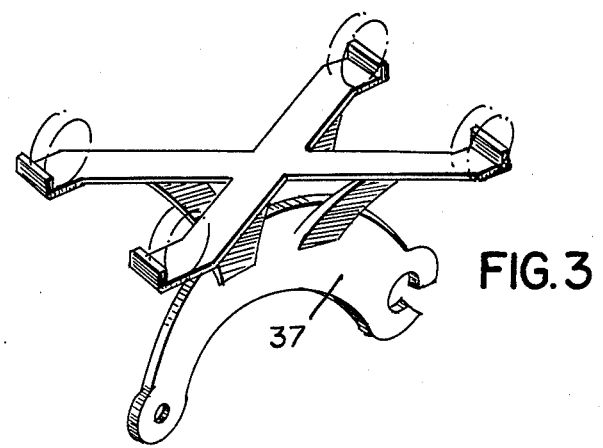
FIG. 3 is an isometric projection of a support component used with the carriage component of FIG. 2.

An alternate support bracket 37, which mounts in the slot 19 in the rectangular ridge 32 of the carriage 10 eg. to carry a four-wheeled vehicle thereon, is shown in FIG. 3.

As the carriage 10 moves along the track 12, the leading portion of such carriage trips the switch 35, shown in FIG. 4, shuts off the air pressure line and ports 26 and activates the vacuum line and ports 28, both ahead of the oncoming carriage 10, and at the same time, turns on the air pressure line and ports 26 and closes the vacuum line and ports 28 behind and under the receding carriage 10, to maximize the forces on the carriage 10 as it travels along the tube 12.

The passenger vehicle 24 and supporting carriage 10 are brought on stream eg. by a switching interchange 42, as illustrated in FIG. 15. Accordingly tracks 44 and 46 converge at intersection 48 having track gaps 52 and 54 therein, as shown in FIG. 15.

A little further on track 46, diverging intersection 56 directs the carriages moving therealong in two different paths, as shown in FIG. 15. Accordingly, diverging tracks 58 and 60 are spaced proximate feeder track 46, also shown in FIG. 15. Switch track 62, when spaced from carriage tracks 46 and 58, permits a carriage thereon, eg. carriage 63, to move from one track to the other in a straight-ahead manner, as illustrated in FIG. 15. When switch track 62 is moved (by means not shown) adjacent track 46, a carriage, eg. carriage 64 moving thereon is guided into a turn and onto a diverging track 60, as shown in FIG. 15. To assist such turning, the carriage 64 desirably has guide fins 66 at the forward end thereof to engage a track switch, such as the track switch 62 and assist the turning thereof from one track to another. Alternatively, a guide fin, which projects upwardly from a track switch, can be moved into engagement with a groove situated in an oncoming carriage, at a lower portion thereof (in place of each of the above carriage fins), to turn such carriage from one track to another.

In such manner, the carriages, eg. carriage 64 are brought on to one track from another or from a stop or station onto a high-speed thoroughfare track. The guideway carriages are, when brought from a stop or station, first brought up to speed on a feeder track, eg. track 44 and inserted at an opportune moment onto the thoroughfare track, eg. track 46 as shown in FIG. 15. In a similar manner the respective carriages are directed to an exit stop or station off the guideway system, eg. are directed from track 46 onto track 60, by switching track 62 in the manner described above with respect to FIG. 15. Once off the high speed track and as the carriage and its cargo, eg. vehicle, approach the station, the pressure vacuum means is reduced and/or braking means are applied, to bring the carriage to a stop where desired.

The vehicle, thus transported, is then disengaged from the carriage at the stop or station and drives off under its own power, as directed by an operator, onto a conventional road or highway system.

In operation, the air pressure differential guideway system of the invention controls the speed of vehicles thereon by regulating the air pressure and vacuum drawn through the respective ports 26 and 28, in rail 12, as shown, eg. in FIG. 4. Accordingly, the vehicles being supported and propelled on the carriage 10, eg. as shown in FIG. 4, can be driven or propelled by the air pressure differential system either automatically or by an operator of vacuum and compressed air switches either in the carriage or at monitoring stations along the guideway system. Automatic propulsion, of course, frees the operator of the vehicle being conveyed on the carriage, for other duties or one can dispense with the need for the presence of such operator during transit of the vehicle in the guideway system embodying the invention.

Various types of cargo can be mounted upon the guideway carriages of the invention, ie. motor vehicles including automobiles, trucks, buses, mail containers, railroad cars, containers for people or goods, shopping carts, aircraft with wings folded, marine craft, one or more chairs, campers, workshops, rooms, offices, and numerous other articles or objects which are desirably transported. Such objects include those which unfold or assemble at a destination into furniture or other articles.

Alternative to the compressed air vacuum propulsion system applied to the carriages in the guideway tube, as discussed above, other propulsion means can be employed. For example, these carriages can be self-propelled on wheels within the guideway tube, can be mounted in a fixed position on moving conveyor belts, be moved forward on revolving bearings mounted in the guideway tubes, towed by continuous cable, or can be powered by steam, electricity or combustion engines or other type engines or motors. These carriages can also be propelled by electromagnetic forces in the guideway system of the invention. Thus, like magnetic charges (e.g. electrically induced) in the sides of the carriage and the sides of the guideway channel will keep such carriage floating, while like polarity charges behind said carriage and opposite polarity charges ahead of the forward end thereof will serve to propel such carriage forward.

Alternatively, the guideway system of the invention can serve as a generator of electricity, the carriage being wound as an armature and the guideway tube being wound to serve as a long magnetic field, the current being generated in the carriage and/or guideway tube windings as the carriage is propelled through the field in the guideway tube, by the various propulsion means disclosed herein.

The guideway channel should advantageously be of reduced air pressure for lower air resistance and higher propulsion speeds of said carriage, although such channel can be open to the atmosphere as indicated above. Preferably, however, such carriages are driven in the guideway system by the compressed air-vacuum propulsion system described at length above.

Accordingly, the electric current receiving brushes 31 can contact electric conducting bars 25 and 27, to supply such carriages with the electric power to drive them, eg. by driving electric motors connected to wheels mounted on such carriages.

Electric power is similarly supplied to the carriage for its power system needs, including running lights, radio, ventilation and the like. Such electric power can also be directed to charge the battery of a motor vehicle while it is being transported on the carriage.

The electric eye 30 mounted on the upper surface of the guideway channel 14, shown in FIG. 4, is tripped by the passing carriage 10 and activates pressure and vacuum switches (not shown) to operate the compressed air tube port 26 and vacuum port 28 in the desired sequence depending on the direction of travel intended to power the carriage 10 in the guideway channel 14. Alternatively, cam switch 33 is triggered by contact with the under-portion of the carriage 10, to control such pressure and vacuum ports in the desired sequence. Such desired sequence applies to operation of adjacent or spaced pressure or vacuum ports in any feasible combination or timing to achieve the desired propulsion.

Also mounted on the upper surface of the rail 12, is air pressure control trigger 35 shown in FIG. 4, which is mounted at spaced intervals proximate the compressed air outlet ports and which upon sensing the weight of the oncoming vehicle, directs the compressed air ports 26 to discharge sufficient air pressure under such carriage to provide an air cushion of adequate support as it rides in the guideway channel on the rail 12. Such switch, which can also be an electromagnetic trigger, can also be controlled by external sources to control the relative air pressure and vacuum systems which in turn control the speed of the carriage riding in the guideway channel.

The guideway system of the invention has guideway channels that are similar to a series of interconnecting air rifle barrels, acting as one lane roadways. The air pressure-vacuum systems are activated by oncoming carriages and cease activity when there is no traffic. The guideway channels of the invention can be installed in existing subway tubes, newly constructed subway tubes, tunnels affixed on land near its surface or above on elevated supports and also be constructed over water or under water when desired or necessary.

The carriage which supports vehicles, cargo and the like, glides in the guideway as described above. Such carriage is desireably shaped like a missle bullet and it travels through the guideway as in a rifle barrel, driven forward by gas pressure differential. In the guideway, including the sealed guideway, such as shown in FIG. 6, pressure differential is created in part by the receding carriage ahead and in part by the proximate vacuum and compressed air ports, to create a series of compressed air-vacuum rotating streams which rotate beneath (including in the under-carriage recess or slot), before and behind the carriage, to drive the same forward through the guideway channel rapidly. The carriage rides on a cushion of air and desireably in a low air pressure zone in front thereof and needs little maintenance.

In the guideway system of the invention, illustrated in FIG. 1, the vehicle carriage 10 travels in reduced air pressure and low air resistance while its cargo, eg. the vehicle above, rides in the atmosphere and is subject to air and wind resistance. In another embodiment of the invention, both carriage and mounted cargo or vehicle, are wholly enclosed in a tube with reduced air pressure before and high air pressure behind, for low air resistance and high speed travel therein. To augment such system, shutter flap valves 34, as shown in FIG. 8, can be mounted in such wholly enclosed guideway tube as described above.

The guideway carriage can change direction in guideway channels as discussed above with respect to FIG. 15. In addition such carriage can enter from a station onto the high speed guideway, eg. by a turntable (not shown) which brings the carriage up to speed and then inserts it into the guideway tube. In like manner, the carriage 10 and supported vehicle 24, exit from the guideway system, i.e. by tangentially engaging a turntable (not shown) and riding off the channel 14.

The carriage and/or guided vehicle can change guideway lanes by external control, eg. by a switch rail operator externally located in the guideway system. Alternatively, there can be a control in the carriage or vehicle which is operated by the occupant to change guideway lanes at intersections.

Scanning electric eyes mounted in the guideway system can cut off power of oncoming carriages in the event of an accident or obstruction ahead. Traffic can then be detoured and obstructions removed from such guideway system at the nearest exit.

Accordingly, the guideway system of the present invention combines the advantages of mass transportation, eg. in reducing the number of operators required and in the width of the travel corridor, with the advantage of private modular transportation. A carriage with a vehicle mounted thereon does not enter the high speed channel guideway system until the electric eye and computer system authorize a clearance therefor and then such carriage is brought up to speed, before it enters into the high speed guideway system so as not to interfere with the attained speed of other carriages already inserted into this system. Because of the relatively low pressure gas system in front of the carriage, high speeds at low fuel, power or energy consumption can be readily attained. Desirable speeds in the guideway system are eg. from 50 to 200 miles per hour and more, depending upon the desired time of arrival and the volume of traffic in the guideway system at the time. Higher speeds can be employed during periods of low traffic. Of course, high speeds of conveyance can be more readily attained with lighter objects than with heavier ones.

A further benefit of the guideway system of the invention is that though it has attributes of mass transportation systems, in transporting people or goods efficiently, in a series of carriage-mounted containers or vehicles, the guideway system has the advantage that such vehicles proceed directly to their destinations without delay. That is, certain vehicles turn off to other guideway systems at intersections and other vehicles proceed ahead, without the inconvenience and delay of many stops to load or unload passengers, mail or goods, eg. as in the case of a train.

The present invention envisions a network of the guideway carriage systems, as discussed above, to replace the motor vehicle highway systems or at least to minimize them and free the vehicle operators for other duties. Such vehicles can have retractable wheels where desired, when mounted on the carriage in the guideway system and when the vehicle reaches its destination as previously discussed, an operator can take over the controls and drive the vehicle off the guideway system of the invention over conventional roads to his destination.

FURTHER DETAILED DESCRIPTION OF THE DRAWINGS

Figure 16:
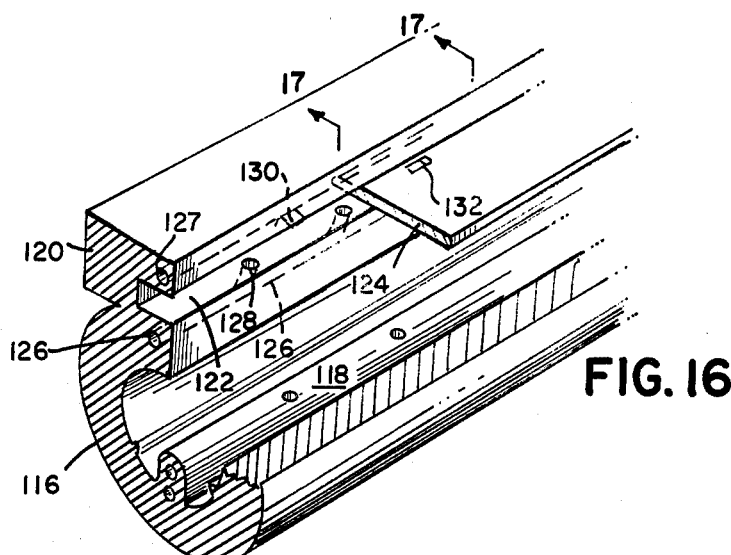
FIG. 16 is an isometric view, partially in section of yet another embodiment of the guideway system of the present invention.
Figure 17:
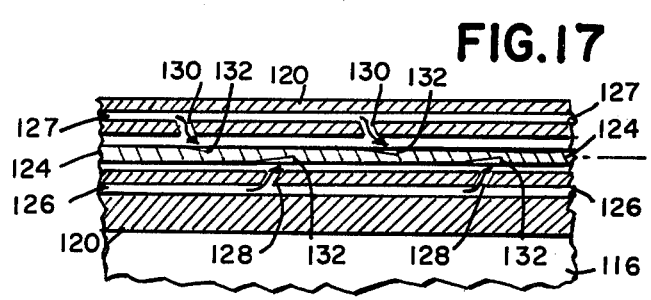
FIG. 17 is a partial sectional elevation view of a portion of the embodiment of the invention shown in FIG. 16.

Guideway tube or channel 116, having rail 118 therein and upper flange housing 120, has spacer groove 122 in which spacer panel 124, connected between missile carriages (not shown) rides, as shown in FIG. 16. Advantageously, the upper flange housing has running proximate said spacer groove 122, compressed air outlet ports 128 and 130, which ports discharge compressed air into the spacer groove 122 above and below the edges of spacer panel 124, and also against the grooves or recesses 132 therein, to propel such panel forward and provide an air cushion around the edges of such spacer panel as it glides in its groove, including spacer groove 122, as shown in FIGS. 16 and 17 and as further indicated in FIG. 20.

Figure 18:
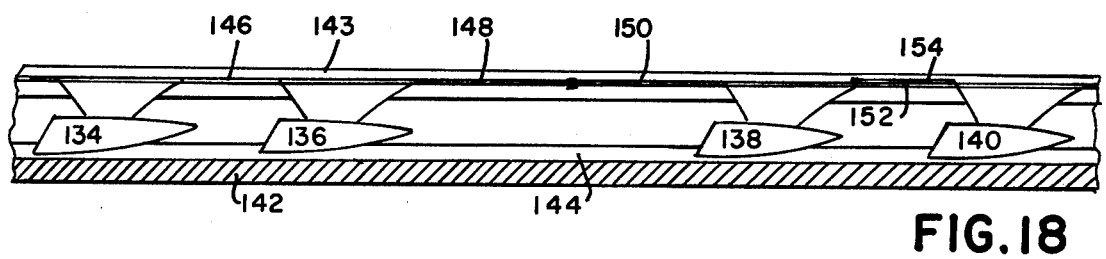
FIG. 18 is an elevation schematic view, partially in section, of another embodiment of the guideway system of the present invention.

In operation, a series, train or sequence of missile carriages 134, 136, 138 and 140, riding in a guideway system 142 on a vacuum-pressure rail 144, as previously discussed, are connected at their upper portions respectively, by spacer panels 146, 148, 150, 152 and 154, as shown in FIG. 18. The spacer panels ride in a groove in upper channel flange housing 143, in the manner described, eg. in FIGS. 16 and 17, which spacer panels serve to seal the guideway channel 142 of FIG. 18 from the atmosphere and similarly serve to seal the guideway channel 116, shown in FIG. 16, from the atmosphere between such missile carriages. Accordingly such spacer panels serve to seal off the guideway system in a manner similar in result, to the purpose served by the shutter gates 76 and 78, shown in FIGS. 6 and 7 herein.

Such spacer panels can be of lightweight material, eg. metal, wood or plastic and preferably plastic. One or more such spacer panels can be positioned between proximate pairs of missile carriages. Further, such spacer panels can be extendable, eg. to close a gap when a missile carriage leaves the guideway system, the spacer panel extending eg. forward, to connect with the next-ahead missile carriage, or a missile carriage subsequently entering the system.

Figure 19:
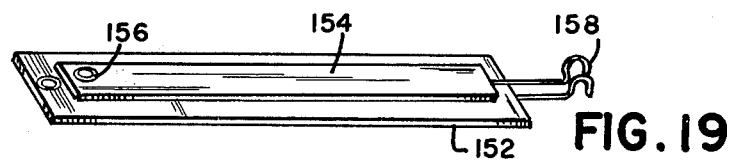
FIG. 19 is a perspective view of a component of another embodiment of the guideway system of the present invention.

In another embodiment, a telescoping spacer panel can be provided where, for example, base spacer panel 152 has slidably mounted thereon, extender spacer panel 154, shown in FIGS. 18 and 19. Such telescoping spacer panels can be employed, eg. when missile carriage 140 leaves the guideway system 142, panel 154 can be moved ahead with respect to panel 152 to form a doubly extensive spacer panel in the manner of spacer panels 148 and 150, as shown in FIG. 18.

Figure 20:
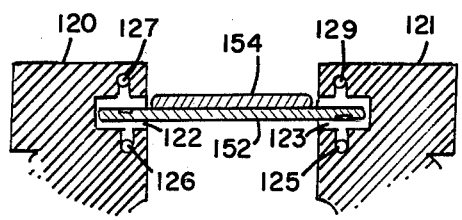
FIG. 20 is an elevation view, partially in section, of a component of FIG. 19 in position in the guideway system embodying the invention.

The spacer panels, as indicated above, ride in a pair of opposed grooves, eg. spacer panels 152 and 154 ride in opposed spacer grooves 122 and 123, as shown in FIG. 20.

Such spacer panels can connect with each other or a missile carriage by any desired connecting means, eg. an aperture 156 and a mating hook 158, such as shown in FIG. 19, can be provided at opposite ends of a spacer panel, as shown in FIG. 19 and at opposite ends of the upper engaging ridge portion of a missile carriage (not shown) in like manner.

The method for extending a spacer panel can be various convenient means including manual, hydraulic, magnetic or other suitable means.

What is claimed is:

1. A guideway system for cargo including vehicles comprising a carriage mounted to glide in a channel, said carriage having support means to hold said cargo thereon, said carriage having at least one longitudinal recess therein adjacent said channel, said channel having a plurality of vacuum intake ports and gas inlet pressure ports therein in sequence along the path of said carriage, which ports align with said recess as it passes by and means to activate said ports so that compressed gas and suction are applied separately to said recess to propel the carriage along said channel.

2. The guideway system of claim 1 wherein said cargo is carried on said carriage above said channel.

3. The guideway channel of claim 1, wherein said channel surrounds said carriage and seals it from the atmosphere.

4. The guideway channel of claim 3 wherein said support means extends outside of said channel to carry cargo in the atmosphere while said carriage glides within the so-sealed channel.

5. The guideway system of claim 2, 3 or 4 having a rail mounted within said channel, said carriage being mounted to glide on said rail, said rail having a compressed air trunk line and a vacuum trunk line positioned longitudinally within said rail, each line having respectively, a series of compressed air outlet ports and vacuum intake ports along said rail at carriage proximity surfaces thereof, a compressed air input source connected to said compressed air line and a vacuum pulling means connected to said vacuum line.

6. The guideway system of claim 5, wherein said rail has a series of trip switches mounted thereon positioned to contact the oncoming carriage and sequentially activate respectively, said air outlet ports and said vacuum intake ports to timely discharge positive air pressure below and aft of said carriage and to draw off air from said channel in advance of said carriage to propel said carriage in said channel.

7. The guideway system of claim 3 or 4, wherein gas pressure means imparts positive gas pressure under and behind said carriage and gas evacuating means reduces the gas pressure in said channel forward of said carriage to propel the carriage forward in said channel.

8. The guideway system of claim 7 having air evacuating means independent of compressed air inlet means to create a strong pressure differential fore and aft of said carriage to propel it forward in said channel.

9. The guideway system of claim 7 wherein camera shutter flap valves are mounted across said channel at intervals to divide the channel into segments, means to reduce the air pressure in said segments, and means to open said valves in sequence before an approaching carriage and means to close said valves therebehind to propel said carriage in said channel.

10. The guideway system of claim 7 having means for controlling the amount of air pressure and vacuum applied to control the speed of the carriage moving in the channel.

11. The guideway system of claim 4 wherein said channel is sealed by longitudinal shutter gates and has means to part said gates ahead of the oncoming carriage cargo support means and means to close said gates after said support means pass by.

12. The guideway system of claim 4 wherein said channel has an open seam through which extends said support means and spacer panels are mounted on said channel across said seam between carriages to seal said channel.

13. The guideway system of claim 12 wherein said spacer panels ride in opposed grooves in the guideway walls and means to discharge a cushion of compressed air in said grooves under the edge of said panels to assist the propulsion thereof.

14. The guideway system of claim 1 wherein said carriage and said cargo both ride within said channel, said channel being a closed tube.

15. The guideway system of claim 1 wherein closely spaced track intersections and track switches direct carriages from one channel to another.

16. The guideway system of claim 1 wherein said cargo is a vehicle detachably mounted on said carriage.

17. The guideway system of claim 1 wherein said activating means includes means to open a vacuum port in said channel as the recess of said carriage passes thereover to draw air out of said recess and pull the carriage forward so that said recess glides proximate a pressure port in said channel, means to close the vacuum port and means to open the pressure port to direct air forwardly into the recess and push said carriage forward to propel same on said channel.

18. The guideway system of claim 1 wherein said activating means comprises a retractable seal gate positioned between each pair of vacuum and pressure ports and means to pop said gate upwardly as said recess pass thereover to divide said recess into a forward portion and an after portion, said activating means opening both of said ports so that air pushes against the forward portion of said recess and said vacuum port draws in the air in the after portion of said recess, to propel the carriage along said channel said activating means further including means to retract said gate as the after end of said recess passes thereover.

19. The guideway system of claims 17 or 18 having means to shut off the vacuum port and the pressure port respectively as each is passed over by the after end of said recess.

20. The guideway system of claim 17 or 18, wherein said channel includes a rail.

21. The guideway system of claim 17 or 18 wherein said channel at least partially surrounds said carriage.

22. The guideway system of claim 17 or 18, wherein said channel is open to the atmosphere.

23. The guideway system of claim 17 or 18, wherein said channel is sealed from the atmosphere.

* * * * *